United States Patent
Costabel et al.

(10) Patent No.: US 8,435,040 B2
(45) Date of Patent: May 7, 2013

(54) CONNECTING DEVICE

(75) Inventors: Sascha Costabel, Otisheim (DE); Markus Schmidt, Gechingen (DE)

(73) Assignee: SFS intec Holding AG, Heerbrugg (CH)

( * ) Notice: Subject to any disclaimer, the term of this patent is extended or adjusted under 35 U.S.C. 154(b) by 142 days.

(21) Appl. No.: 13/144,013

(22) PCT Filed: Feb. 23, 2010
(Under 37 CFR 1.47)

(86) PCT No.: PCT/EP2010/052262
§ 371 (c)(1),
(2), (4) Date: Jul. 11, 2011

(87) PCT Pub. No.: WO2010/100057
PCT Pub. Date: Sep. 10, 2010

(65) Prior Publication Data
US 2011/0318091 A1 Dec. 29, 2011

(30) Foreign Application Priority Data
Mar. 5, 2009 (DE) .......................... 10 2009 011 904

(51) Int. Cl.
*H01R 33/00* (2006.01)
(52) U.S. Cl.
USPC .......................................................... 439/34
(58) Field of Classification Search .................... 439/34, 439/595, 24, 246, 382
See application file for complete search history.

(56) References Cited

U.S. PATENT DOCUMENTS

| | | | |
|---|---|---|---|
| 7,595,457 B2* | 9/2009 | Heite et al. .............. | 200/61.54 |
| 8,342,880 B2* | 1/2013 | Kato et al. ............... | 439/595 |
| 2003/0045133 A1* | 3/2003 | Hirschfeld et al. ........... | 439/34 |
| 2008/0268662 A1* | 10/2008 | Krivtsov et al. ............... | 439/34 |
| 2010/0050855 A1* | 3/2010 | Kubinski et al. ............... | 89/1.8 |
| 2012/0009804 A1* | 1/2012 | Heichal et al. ............... | 439/34 |

FOREIGN PATENT DOCUMENTS

| | | |
|---|---|---|
| DE | 8212130.3 | 8/1982 |
| DE | 102006012730 | 11/2007 |
| EP | 1193403 | 4/2002 |

OTHER PUBLICATIONS

Cabin Development—New Approach for the A350—Cabin Customization, One (magazine), German edition, Dec. 18, 2006, p. 23.

* cited by examiner

*Primary Examiner* — Jean F Duverne
(74) *Attorney, Agent, or Firm* — Volpe and Koenig, P.C.

(57) ABSTRACT

A connecting device (10) is provided for releasably connecting a fitting piece, such as an interior lining, to a supporting structure, such as a fuselage. The connecting device (10) includes a plug-in holding mechanism (50) including a bushing piece (52) and a connecting pin (75) that can be releasably locked therein. A bent connecting arm (60), to which the connecting pin is fastened, is releasably fastened to a structural holder (40) mounted on the supporting structure. In one position, the connecting arm (60) is plugged into the structural holder (40) and is releasably locked therein. In a second position (125), in which the connecting arm (60) is rotated 180° about the longitudinal axis thereof, an electrical contact device (90) is additionally inserted between the connecting arm (60) and the bushing piece (52). Hence, the same structural holder (40) and the same connecting arm (60) allow the fitting piece and the supporting structure to be connected to one another with or without connecting a contact device (90) therebetween.

13 Claims, 5 Drawing Sheets

CONNECTING DEVICE

BACKGROUND

The invention relates to a device for the detachable connection of an interior-equipment piece, such as interior paneling, to a support structure, such as an aircraft fuselage, comprising a plug-in holding mechanism made from a socket part and a connection pin that can be latched detachably in the socket, and a structure bracket and a bent connection arm for fastening the plug-in holding mechanism between the interior-equipment piece and the support structure, wherein the connection arm has a first and a second end part, one of which supports the connection pin.

In the development of cabins for newer types of aircraft, such as, for example, the Airbus A350, one goal is to design elements to be fastened to the fuselage of the aircraft, such as restrooms, galleys, passenger seats, cabin power networks, cabin lighting, and air nozzles, each as a complete cabin module, wherein, however, all of the connection points should be constructed as flexible, standardized interfaces and wherein simplified fastener designs should be used that allow assembly and disassembly without the use of tools (cf., the article "Cabin Development—New Approach for the A350—Cabin Customization," One (magazine), German edition, Dec. 18, 2006, pg. 23). Devices of the type named above are designed, in contrast, for the fastening of elements of the interior paneling of an aircraft, such as wall and ceiling paneling parts. In principle, it should also be possible to reconfigure, on short notice, an existing, configuration, for example, the cabin equipment for a long-haul flight, in order to prepare, for example, the cabin equipment for a short-haul flight. The standardized interfaces should be applicable equally for all categories of aircraft. Furthermore, it should be guaranteed that the standardized interfaces reliably prevent rattling noises of the components connected to each other.

A device of the type noted above is known from EP 1 193 403 A2. This known device is a plate unit adjustable in the X/Y coordinate directions for wall paneling elements to be attached detachably by spring clips and consists of a first base plate adjustable in the X-direction and a second holding plate adjustable in the Y-direction. The base plate has at least two first elongated holes oriented in the X-direction and aligned with each other for the imagined fastening of the base plate adjustable in the X-direction to a wall that could involve the support structure or the fuselage of an aircraft. The holding plate has at least two second elongated holes oriented in the Y-direction and aligned with each other and through which the base plate is connected to the holding plate adjustable in the Y-direction by means of connection elements. On the holding plate, holding springs for receiving holding socket pins are arranged on the side facing the base plate at the corners of an imaginary rectangle oriented in the X/Y directions, wherein these socket pins form the connection pins of a plug-in holding mechanism and are connected to a wall paneling element that could involve a part of the interior paneling of an aircraft. The connection pin or holding socket pins is/are connected to the wall paneling element by means of a damping element and a bent connection arm. For this purpose, the connection arm has two drill holes for fastening the wall paneling element, wherein there is not more detailed information on the type of fastening in EP 1 193 403 A2.

In an aircraft, when a part of the interior paneling, such as, for example, a panel that could support parts of the electrical equipment, is swung outward from the ceiling or from the interior wall like a flap, the cables that are connected to the interior-equipment parts on the panel must move along the path of the panel. So that the cables do not obstruct the movement of the panel, the cables connected to the panel must have a certain extra length. In an aircraft, where the length of the installed cables measures many kilometers, the extra cable lengths mentioned above lead to undesired extra weight that could lie on the order of magnitude of several hundred kilograms. If a panel is to be detached from the ceiling or the interior paneling, it is also necessary to disconnect electrical plug connections that must be reconnected later by hand when the panel is reinstalled.

DE 10 2006 012 730 B3 describes a fastening system for fastening a cabin-equipment element to a support structure of an aircraft with which the previously mentioned problems of extra cable length and the making and breaking of plug-in connections should be able to be solved in part. To this end, work starts from the idea of integrating the necessary electrical contacts that must be broken for removal of a part of the interior paneling and must be later made again in at least one of several mechanical supports to which the support structure and interior paneling are connected, so that for coupling, one electrical connection with several contacts is made between the support structure and the interior paneling. In this known fastening system, an electrical contact device is constructed with a socket arrangement and a plug arrangement in at least one bearing of an interior-equipment part through which an electrical connection is made between the support structure and the electrical device of the cabin-equipment part for fixing this support. This support with integrated contact device, however, has a different configuration of the fastening system than a support without a contact device. This makes the use of this known fastening system inflexible.

SUMMARY

The objective of the invention is to form a device of the type noted above so that, when needed, in a simpler and more flexible way, it can be changed to a support with a contact device.

This objective is met according to the invention by a device of the type noted above in which the connection arm is dimensioned so that, when the connection pin is latched detachably in the socket part, the connection arm is in a first position in which it and the socket part are in contact with each other in a dividing plane, but, when the connection arm is in a second position rotated by 180° about its longitudinal axis, the connection arm has a distance from the dividing plane that is bridged or can be bridged by an electrical contact device to be arranged between the connection arm and the socket part, wherein a different connection pin that is attached on the connection arm and is dimensioned longer by this distance than the one connection pin is guided or can be guided through this contact device and is latched or can be latched in the socket part.

The device according to the invention allows the making of a connection between an interior-equipment part and a support structure with the help of a structure bracket and a connection arm attached detachably on this bracket selectively with or without an electrical contact device. If no electrical contact device is needed, the connection arm is brought into a first position on the structure bracket. If an electrical contact device should be integrated in the connection, only the connection arm needs to be brought into a second position rotated by 180° about the longitudinal axis of the connection arm. The structure bracket keeps its original position. When the connection is made and an electrical contact device is located between the connection arm and the socket part, the socket part assumes the same spatial position as in the case in which no electrical contact device is located between it and the connection arm. Due to its configuration, for the use of an electrical contact device, the device according to the invention therefore also needs only one connection pin that is longer by the distance that is bridged by the electrical contact device between the connection arm and the socket part. For the device according to the invention, either the same connection arm can be used on which the connection pin is exchanged for a different connection pin with corresponding length, before the connection arm is latched in its second position rotated by 180° back on the structure bracket, or a different connection arm already prefabricated with a longer connection pin could be used that is then exchanged merely for the connection arm with a shorter connection pin, when an electrical contact device is to be used, and vice versa.

In contrast to the prior art mentioned above according to EP 1 193 403 A2, for the device according to the invention, the bent connection arm is attached on the structure bracket instead of on the interior-equipment part. The structure bracket that is used according to the invention and is advantageously fastened indeed to the support structure but could be fastened alternatively or also additionally to the interior-equipment part, does not need to be modified in its configuration, regardless of whether an electrical contact device is being used or not. A connection pin could be exchanged in a simple way for a longer or shorter connection pin according to whether an electrical contact device is being used or not.

From DE 82 12 130 U1, it is known to fasten bent or step-shaped cable bracket line poles on a work bench in a pluggable manner, in order to be able to mount fittings of a cable section at different heights. Through the stepped shape of the cable bracket line poles, through the height difference of the inserts in table boards of the work bench, and through the possibility to be able to fix the cable brackets in their inserts pointing upward and downward under the use of the displacement length, the mounting of fittings of a cable section with fittings lying on the floor is just as possible as the mounting of fittings at chest height for the purpose of demonstration. The different heights are here produced not only by rotation of the cable bracket line poles, but also with the help of adapters and cable brackets, wherein the adapters could have spacer pieces of different lengths. In their different constructions, the adapters should allow the largest possible spread in variation in the combination of the cable bracket and the accessories relative to each other and their position. The rotation of the cable bracket line poles about the insertion axis is thus used not for the production of different distances to a reference surface. The rotation about the insertion axis is not used at least for the same purpose as the setting of the two positions for the bent connection arm of the device according to the invention.

Advantageous constructions of the invention form the subject matter of the subordinate claims.

In one construction of the device according to the invention, the structure bracket is a flat, plate-shaped, polygonal body with at least one pair of mutually opposing sides that has at least one chamber that opens into one of these sides and in which the first end part of the connection arm is locked or can be locked detachably. This configuration allows the connection arm to be easily brought into a desired, different position through rotation by 180° about its longitudinal axis.

In another construction of the device according to the invention, each of the sides into which the chamber opens has a projection with an end face angled against this side, wherein the chamber opens into this end face. This configuration allows, also on the opposite side of the body of the structure bracket, an equal chamber for at least one additional connection arm to be provided or a chamber for a connection arm to be provided on all of the sides.

In another construction of the device according to the invention, each connection pin is connected using a damping element to the second end part of its connection arm. The damping element is advantageously an elastic body. This allows the connection between the support structure and the interior-equipment part to be made in an elastically biased way, wherein undesired rattling noises during use can be prevented even more easily.

In another construction of the device according to the invention, the damping element extends through the second end part of the connection arm and projects past the connection arm on both sides. Therefore, the damping element comes into contact with the part to be attached to the connection arm, namely with the socket part of the plug-in holding mechanism or with the electrical contact device, and thus provides for an elastically flexible changeover between these parts.

In another construction of the device according to the invention, the detachable connection of the connection arm with the structure bracket is a clip connection or a screw connection. The connection arm thus can be disconnected in a simple way from the structure bracket and can be attached to the structure bracket again after rotation by 180° about its longitudinal axis.

In another construction of the device according to the invention, a retainer frame attached on the plate-shaped body of the structure bracket between two mutually opposing sides is provided for fastening the structure bracket onto the support structure. The retainer frame allows the entire structure bracket to be adjusted in two directions.

In another construction of the device according to the invention, each connection pin is attached on its connection arm so that it projects toward the dividing plane when the connection arm is fastened to the structure bracket. In this way, the connection pin of the plug-in holding mechanism can always be brought into engagement with the socket part of this mechanism, regardless of whether an electrical contact device is being used or not.

In another construction of the device according to the invention, the socket part has a housing that contains a spring-biased slide that can be deflected by the insertion of one or the other connection pin. Regardless of whether an electrical contact device is being used or not, the connection pin of the plug-in holding mechanism can be brought into engagement with the socket part of this mechanism. The socket part keeps its spatial position, because the connection pin of the plug-in holding mechanism is always brought into engagement with the socket part in the same axis, regardless of whether an electrical contact device is being used or not.

In another construction of the device according to the invention, an eccentric lever for actuating the spring-biased slide is attached on the housing of the socket part. This eccentric lever allows, in a simple way, the detachment of the connection between the interior-equipment part and the support structure, and indeed regardless of whether an electrical contact device is being used or not.

In another construction of the device according to the invention, each connection pin has, on its free end, a groove with which the spring-biased slide is or can be brought in engagement. The mechanical connection and the electrical connection are then made when the slide is in engagement with the groove of the connection pin.

In another construction of the device according to the invention, each connection pin has, on its other end, another groove with which a holding plate is or can be brought into engagement. The holding plate that advantageously engages with radially inward projecting, elastic fingers in the additional groove allows, in a simple way, the connection pin to be fastened to the connection arm or the connection pin to be replaced for a different, longer or shorter connection pin.

In another construction of the device according to the invention, the contact device has electrical contacts that can be connected to each other and can be disconnected from each other in the direction of the longitudinal axis of the connection pin. At the same time with the making/breaking of the mechanical connection between the interior-equipment part and the support structure, an electrical connection can thus also be made/broken automatically.

BRIEF DESCRIPTION OF THE DRAWINGS

Embodiments of the invention are described in detail below with reference to the drawings. Shown are.

DETAILED DESCRIPTION OF THE PREFERRED EMBODIMENTS

Figure 1:
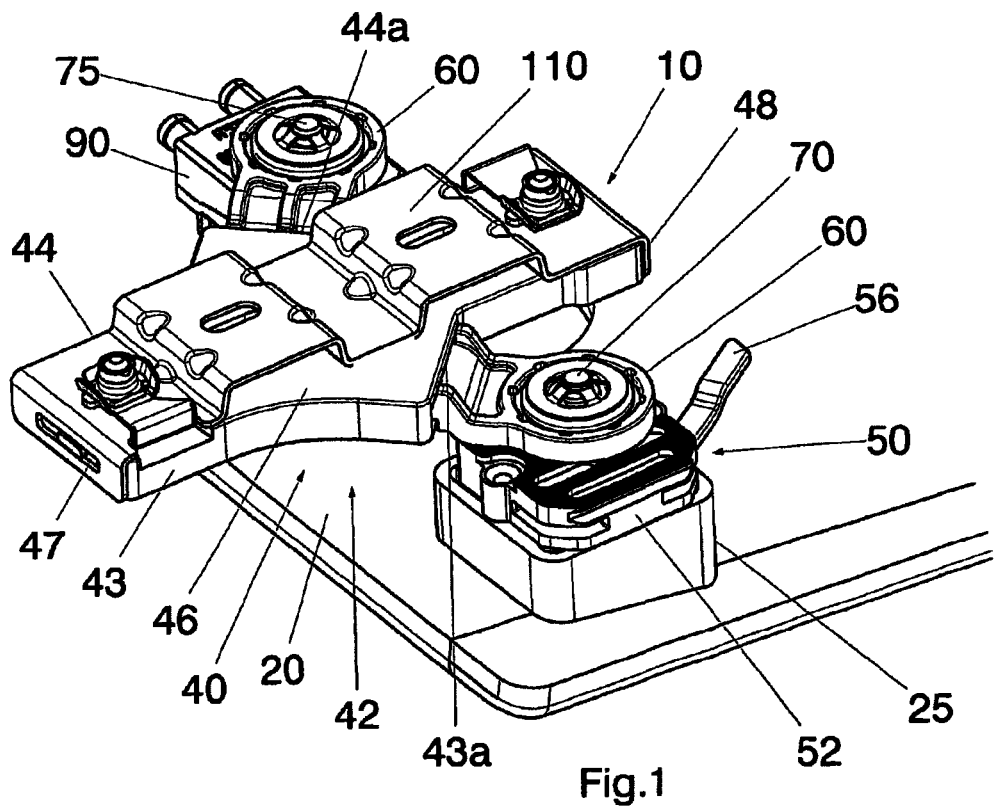
FIG. 1, in a perspective representation, a first embodiment of a connection device according to the invention, FIG. 2, as a detail in side view, the right part of the connection device shown in FIG. 1, FIG. 3, the connection device according to FIG. 2 in exploded-view representation, wherein a structure bracket is not shown for the sake of clarity, FIG. 4, in the same representation as in FIG. 1, the first embodiment of the connection device according to the invention, but in a representation rotated by 90° in the counter-clockwise direction compared with the representation in FIG. 1, FIG. 5, as a detail in side view, the left part of the connection device shown in FIG. 1, FIG. 6, the connection device according to FIG. 5 in an exploded-view representation, wherein a structure bracket is not shown for the sake of clarity and wherein, in FIG. 6a, a connection pin is shown as a detail, and FIG. 7, in side view, a second embodiment of a connection device according to the invention in which an electrical contact device is shown in a position rotated by 90° in the clockwise direction compared with the representation in FIG. 4.

A first embodiment of a connection device according to the invention that is designated overall with 10 is shown in FIG. 1 in a perspective diagram in a view at an angle from above. The connection device 10 is used for the detachable connection of an interior-equipment part 20 to a support structure 30 (indicated only in FIG. 7). The interior-equipment part 20 could be the interior paneling of the cabin of an aircraft, wherein the support structure 30 is then the aircraft fuselage. The connection device 10 comprises a structure bracket (called Strukturhalter in German) 40 and at least one bent connection arm 60. In the illustrated embodiment, the connection device 10 has a structure bracket 40 with two bent connection arms 60. A connection device 10 with only one bent connection arm 60 or with four or more than four bent connection arms 60, however, is also possible. Each connection arm 60 is attached to a plug-in holding mechanism designated overall with 50 in the figures. The plug-in holding mechanism 50 connects the interior-equipment part 20 via the connection arm 60 detachably to the structure bracket 40 that is fastened on its side by a retainer frame 110 made from metal or a carbon-fiber material to the support structure 30. The retainer frame 110 is fastened on the top side 49 of the body 42 of the structure bracket 40 and is angled at its ends so that it extends past sides 47 and 48 of the body 42.

Figures 2, 5:
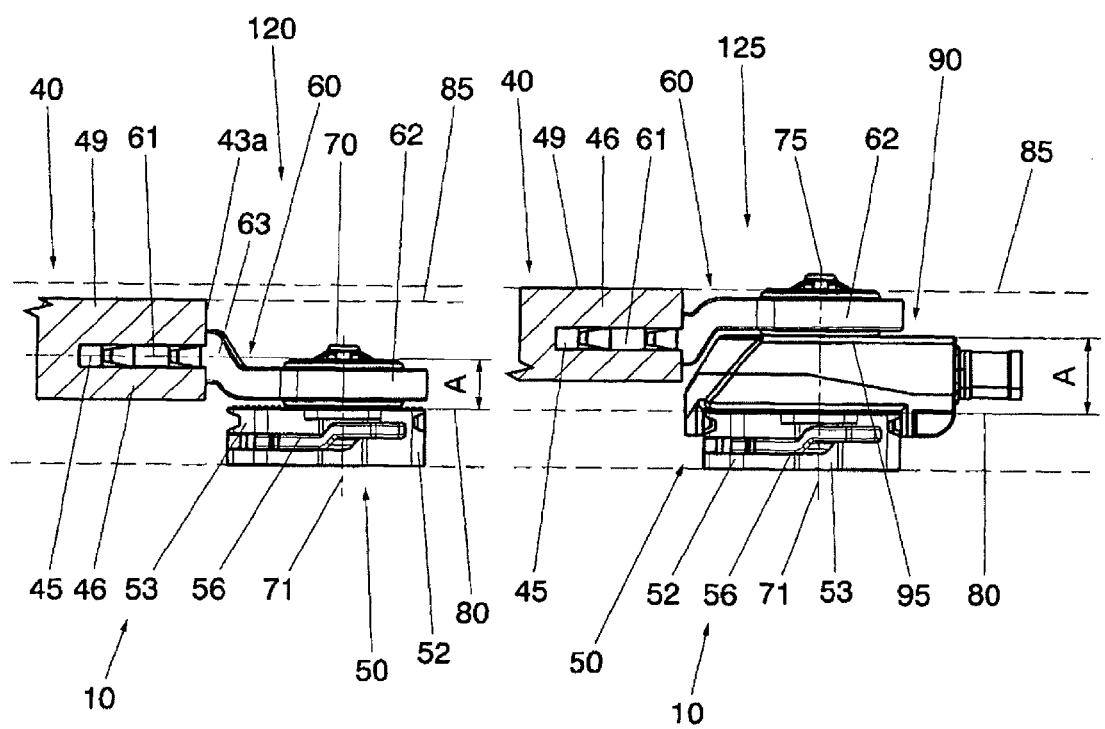
Figure 3:
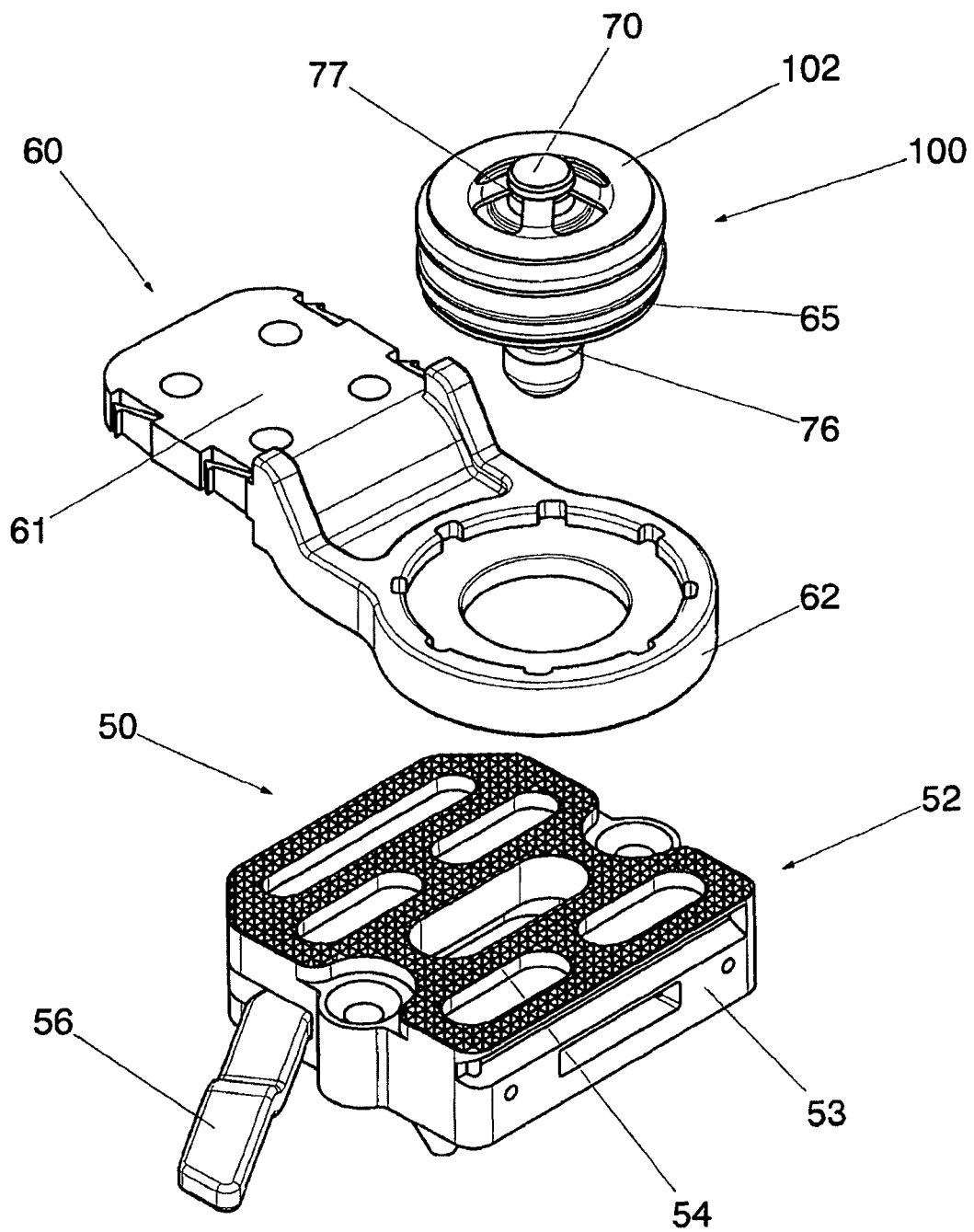

The plug-in holding mechanism 50 that is shown in FIG. 3 in an exploded-view representation comprises a socket part designated overall with 52 and a connection pin 70 that can be locked detachably in this socket part. According to the representation in FIGS. 2 and 3, the connection arm 60 has a first end part 61 and a second end part 62. The first end part 61 is inserted into the structure bracket 40 according to the representation in FIG. 2 and is locked detachably in this structure bracket. The second end part 62 of the connection arm 60 carries the connection pin 70 that is fastened in an elastically flexible way to the second end part 62 by a damping element 100.

The structure bracket 40 is a flat, plate-shaped, polygonal body 42 with paired, mutually opposing sides 43, 44 and the sides 47, 48 already mentioned above. Each connection arm 60 is a separate part that is inserted into the structure bracket 40 in a first position 120 according to FIG. 2 or in a second position 125 according to FIG. 5 and can be locked detachably in this structure bracket. For each connection arm 60, the structure bracket 40 has a chamber 45 that can be seen in FIG. 2 and opens outward into one of its sides 43, 44. The structure bracket 40 has, on the two mutually opposing sides 43, 44, a molded projection 46 that has an end face 43a or 44a that is angled against this side and from which extends the chamber 45 into the body 42 of the structure bracket 40. The body 42, the socket part 52, and the connection arms 60 are made preferably from plastic that can be reinforced with glass or carbon fiber or from any other material typical in aircraft engineering. The detachable connection of the connection arm 60 to the structure bracket 40 is a clip connection in the illustrated embodiment, but could just as well be a screw connection. The damping element 100 that is mounted on the second end part 62 of the connection arm 60 projects on both sides past the connection arm 60, as can be seen best in FIG. 2.

The socket part 52 of the plug-in holding mechanism 50 has a housing 53 that contains a spring-biased slide 54 that is partially visible in FIG. 3. The slide 54 can be deflected by the insertion of the connection pin 70 of the plug-in holding mechanism 50. An eccentric lever 56 for the manual actuation, that is, for example, for the detachment of the spring-biased slide 54, is attached on the housing 52 of the socket part 50.

The connection device 10 allows the production of a connection between the interior-equipment part 20 and the support structure 30 with the help of the structure bracket 40 and the connection arms 60 attached detachably on this structure bracket selectively with or without an electrical contact device 90. The socket part 52 fastened on the interior-equipment part 20 forms a support through which an electrical connection between the support structure 30 and an electrical device of the interior-equipment part 20 can be produced when this support is fixed by the connection arm 60. Without an electrical contact device 90, the support has the configuration as shown in FIG. 2. With the electrical contact device 90, the support has the configuration as shown in FIG. 5.

For this purpose, the connection arm 60 is dimensioned so that, when the connection pin 70 is locked detachably in the socket part 52 as in FIG. 2, the connection arm 60 in the first position 120 is in contact via the damping element 100 with the socket part 52 in a dividing plane 80. In the second position 125 that is shown in FIG. 5 and in which the connection arm 60 is rotated by 180° about its longitudinal axis, the connection arm 60 has a distance A from the dividing plane 80, wherein this distance is bridged by the electrical contact device 90 arranged between the connection arm 60 and the socket part 52. In this case, another connection pin 75 that is attached on the connection arm 60 and is dimensioned longer by this distance A than the connection pin 70 is led through the contact device 90 and locked in the socket part 52.

Figure 6:
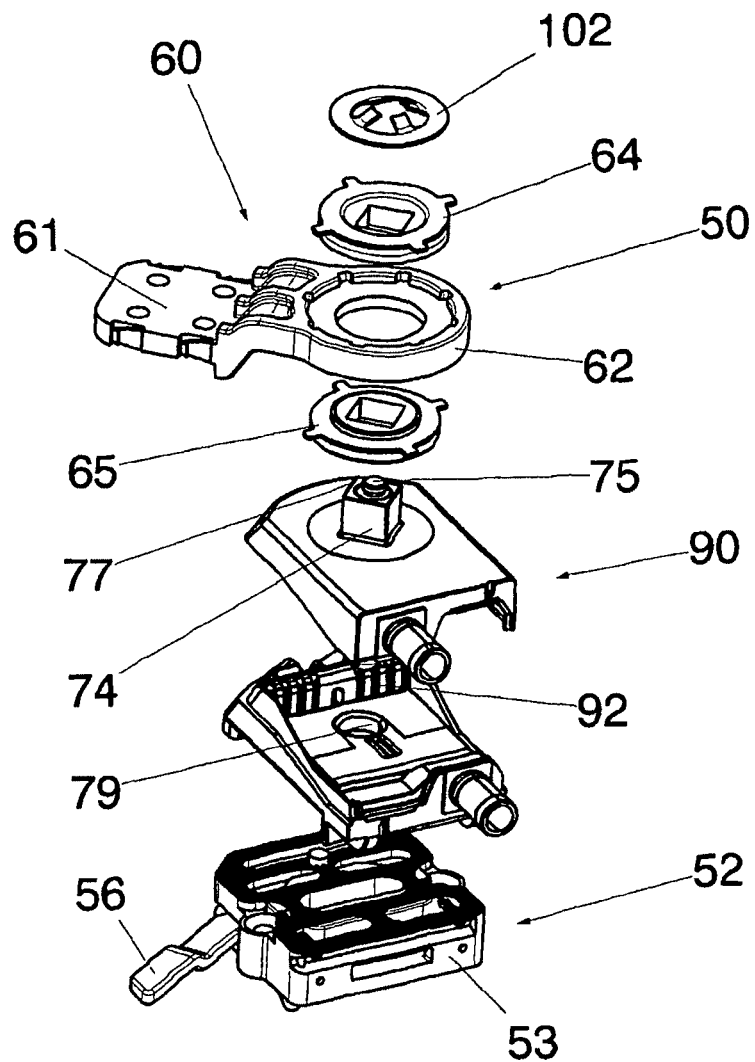

In FIGS. 3 and 6, the use of different-length connection pins 70 and 75, respectively, is shown in perspective for the case that the connection arm 60 is located in the position 120 according to FIG. 2 or in the position 125 according to FIG. 5. In addition, in FIG. 6 the electrical contact device 90 is shown in an exploded-view representation. Each connection pin 70, 75 is attached on its connection arm 60 so that it projects toward the dividing plane 80 when the connection arm 60 is fastened on the structure bracket 40, as can be seen in FIGS. 2 and 5. According to the representation in FIG. 6, the contact device 90 has electrical contacts 92 that can be connected to each other and can be disconnected from each other in the direction of the longitudinal axis 71 (cf. FIG. 5) of the other connection pin 75. In FIG. 6, only the electrical contacts 92 on the lower half of the contact device 90 are visible. For this purpose, the upper half of the contact device 90 carries complementary electrical contacts. Each connection pin 70, 75 has, on its free end, a groove 76 (FIGS. 3 and 6a) with which the spring-biased slide 54 can be brought into engagement. In addition, each connection pin 70, 75 has on its other end another groove 77 with which a holding plate 102 of the damping element 100 can be brought into engagement. According to FIG. 6, the holding plate 102 has radially inward projecting, elastic fingers that engage in the groove 77, so that the second end part 62 of the connection arm 60 can be tightened in an elastic and detachable way between two stop rings 64, 65 on the connection pin 70 or 75. For reaching the position 120, 125 according to FIGS. 2 and 5, respectively, connection arms 60 can be kept in storage with one or the other connection pin 70 or 75. However, it is likewise possible, when necessary, to replace the connection pin 70 for a connection pin 75, and vice versa, on site.

Figure 4:
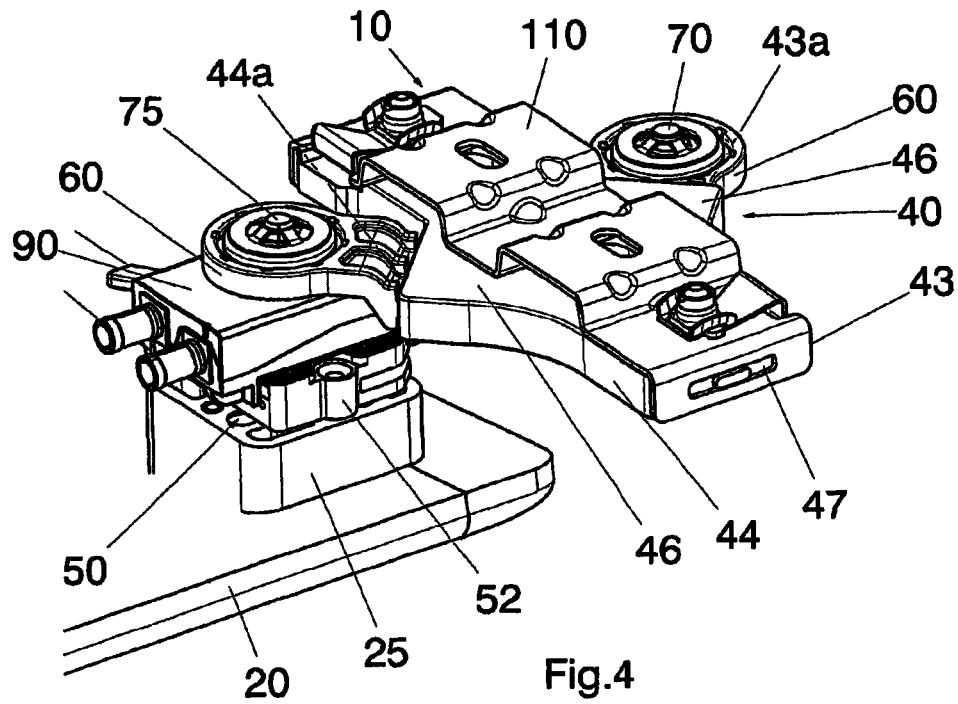
Figure 7:
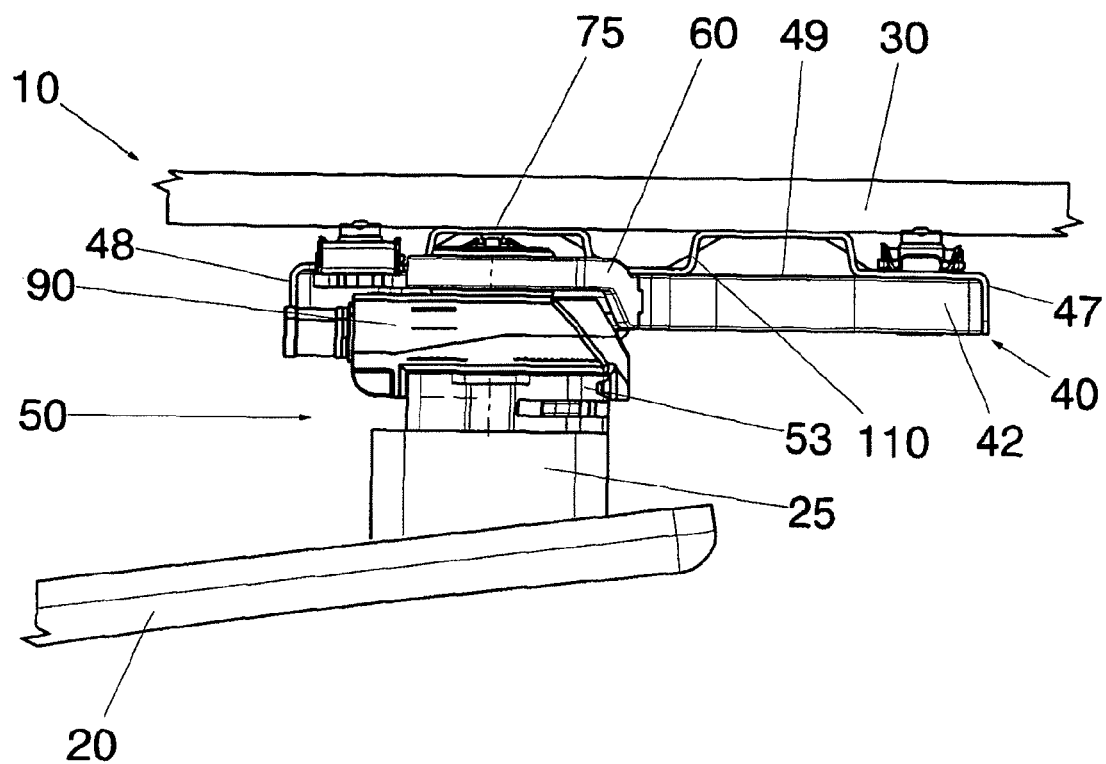

According to the representation in FIGS. 1, 4, and 7, for adaptation to different installation situations, the housing 53 of the socket part 52 of the plug-in holding mechanism 50 is to be connected to the interior-equipment part 20 by a connector bracket (called Verbinderhalter in German) 25.

Figure 6A:
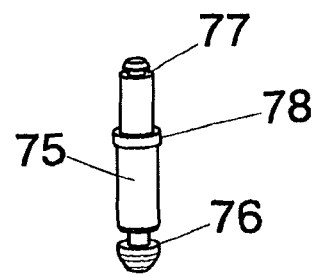

In FIG. 6a, the connection pin 75 of the plug-in holding mechanism 50 according to FIG. 6 is shown as a detail. Below the groove 77, the connection pin 75 is provided with a collar 78. The upper half of the electrical contact device 90 carries, according to the representation in FIG. 6, a socket 74 with a square cross section. The socket 74 has a drill hole into which the connection pin 75 can be inserted from below until the collar 78 contacts the socket 74 and the groove 77 is located above the socket 74, as shown in FIG. 6, so that the elastic fingers of the holding plate 102 can engage in the groove 77. The lower part of the connection pin 75 extends through a drill hole 79 into the lower half of the contact device 90, so that the spring-biased slide 54 can be brought into engagement with the groove 76.

LIST OF REFERENCE SYMBOLS

10 Connection device
20 Interior-equipment part
25 Connector bracket
30 Support structure
40 Structure bracket
42 Body
43 Side
43a End face
44 Side
44a End face
45 Chamber
46 Projection
47 Side
48 Side
49 Top side
50 Plug-in holding mechanism
52 Socket part
53 Housing
54 Slide
56 Cam lever
60 Connection arm
61 First end part
62 Second end part
63 Longitudinal axis
64 Stop ring
65 Stop ring
70 Connection pin
71 Longitudinal axis
74 Socket
75 Other connection pin
76 Groove
77 Groove
78 Collar
79 Drill hole
80 Dividing plane
85 Plane
90 Electrical contact device
92 Electrical contacts
100 Damping element
102 Holding plate
110 Retainer frame
120 First position
125 Second position rotated by 180°
A Distance

The invention claimed is:

1. An attachment system (10) for the detachable fastening of an interior-equipment part (20) to a support structure (30), comprising at least one plug-in holding mechanism (50) made from a socket part (52) and a connection pin (70) that can be latched detachably in the socket part, a structure bracket (40) with at least one connection arm (60) for fastening the plug-in holding mechanism (50) between the interior-equipment part (20) and the support structure (30), an electrical contact device (90) locatable between the connection arm (60) and the socket part (52), the connection arm (60) has a first and a second end part (61, 62), one of which (62) carries the connection pin (70), the connection arm (60) is dimensioned so that, when the connection pin (70) is latched detachably in the socket part (52), the connection arm (60) is in a first, normal position (120) in which the connection arm and the socket part (52) are in contact with each other in a dividing plane (80), and when the connection arm (60) is in a second position (125) rotated by 180° about its longitudinal axis, the connection arm (60) has a distance (A) from the dividing plane (80) that bridges or is bridgeable by the electrical contact device (90) to be arranged between the connection arm (60) and the socket part (52), using a different connection pin (75) that is attached on the connection arm (60) and is longer by the distance (A) than the one connection pin (70) is guided or guidable through the contact device (90) and is latched or latchable in the socket part (52), wherein a spacing of the structure bracket (40) from the socket part (52) in a direction of the connection pin (70) for a normal assembly of the connection arm (60) without placement of the electrical contact device (90) and for a 180° rotated placement of the connection arm (60) with placement of the electrical contact device (90) remains the same, and the structure bracket (40) is formed such that it includes a receiver that allows movement of the connection arm (60) between the first, normal position and the second position that is rotated by 180°.

2. The attachment system (10) according to claim 1, wherein the structure bracket (40) is a flat, plate-shaped, polygonal body (42) with at least one pair of mutually opposing sides (43, 44), wherein the structure bracket has at least one chamber (45) that opens into one of the sides (43, 44) that forms the receiver in which the first end part (61) of the connection arm (60) is detachably lockable or locked.

3. The attachment system (10) according to claim 2, wherein each of the sides (43, 44) into which the chamber (45) opens has a projection (46) with an end face (43*a*, 44*a*) angled against the side, wherein the chamber (45) opens into the end face (43*a*, 44*a*).

4. The attachment system (10) according to claim 1, wherein each of the connection pins (70, 75) is connected via a damping element (100) to the second end part (62) of the connection arm (60).

5. The attachment system (10) according to claim 4, wherein the damping element (100) extends through the second end part (62) of the connection arm (60) and projects on both sides past the connection arm (60).

6. The attachment system (10) according to claim 1, wherein the detachable connection of the connection arm (60) to the structure bracket (40) is a clip connection or a screw connection.

7. The attachment system (10) according to claim 2, further comprising a retainer frame (110) attached on the plate-shaped body (42) of the structure bracket (40) between the two mutually opposing sides (43, 44) for fastening the structure bracket (40) onto the support structure (30).

8. The attachment system (10) according to claim 1, wherein each of the connection pins (70, 75) is attached on the connection arm (60) so that it projects toward the dividing plane (80) when the connection arm (60) is fastened to the structure bracket (40).

9. The attachment system (10) according to claim 1 wherein the socket part (52) has a housing (53) that contains a spring-biased slide (54) that is deflectable by insertion of one or the other of the connection pins (70, 75).

10. The attachment system (10) according to claim 9, further comprising an eccentric lever (56) attached on the housing (53) of the socket part (52) for the actuation of the spring-biased slide (54).

11. The attachment system (10) according to claim 9, wherein each of the connection pins (70, 75) has, on a free end thereof, a groove (76) with which the spring-biased slide (54) is engageable or engaged.

12. The attachment system (10) according to claim 11, wherein each of the connection pins (70, 75) has, on an other end thereof, another groove (77) with which a holding plate (102) is engageable or engaged.

13. The attachment system (10) according to claim 1, wherein the contact device (90) has electrical contacts (92) that can be connected to each other and can be separated from each other in a direction of a longitudinal axis (71) of the other connection pin (75).

* * * * *